United States Patent

[11] 3,600,671

| [72] | Inventors | Royston Walter Bannister<br>Tunbridge;<br>Brian M. Lewis, London, both of, England |
|---|---|---|
| [21] | Appl. No. | 15,746 |
| [22] | Filed | Mar. 2, 1970 |
| [45] | Patented | Aug. 17, 1971 |
| [73] | Assignee | International Standard Electric Corporation<br>New York, N.Y. |
| [32] | Priority | Mar. 7, 1969 |
| [33] | | Great Britain |
| [31] | | 12224/69 |

[54] METHOD FOR DETERMINING CONTACT CLOSING BEHAVIOR OF A BIFURCATED CANTILEVER SPRING
2 Claims, 3 Drawing Figs.

[52] U.S. Cl. ............................................. 324/28 R, 324/43 R
[51] Int. Cl. ...................................................... G01r 31/02
[50] Field of Search ............................................. 324/28 R, 28 CR, 28 SE, 43 R

[56]   References Cited
UNITED STATES PATENTS
2,609,424  9/1952  Elliot ............................ 324/28 R
3,348,075  10/1967  Wagar ......................... 324/28 R Primary Examiner—Rudolph V. Rolinec
Assistant Examiner—R. J. Corcoran
Attorneys—C. Cornell Remsen, Jr., Walter J. Baum, Percy P. Lantzy, J. Warren Whitesel, Delbert P. Warner and James B. Raden ABSTRACT: An electrical testing procedure is shown for detecting whether a pair of bifurcated contacts close at the same time and, if not, which contact is closing first. Detection of contact closing is accomplished by detecting alternating current caused magnetic fields adjacent the separate portions of the bifurcated contact arms.

PATENTED AUG 17 1971 3,600,671

INVENTOR
R.W.Bannister-B.M.Lewis
BY D.D.Warner
ATTORNEY

METHOD FOR DETERMINING CONTACT CLOSING BEHAVIOR OF A BIFURCATED CANTILEVER SPRING

This invention relates to a method of determining the contact-closing behavior of a bifurcated spring in, say, a telephone relay.

It is a requirement of such relays incorporating bifurcated springs that both pairs of contacts shall have made at some appropriate time during the switching operation or that they shall make together. It is easy to determine by continuity that at least one pair of contacts has closed but it is more difficult to show, other than visually, that both pairs of contacts are made. It is also necessary to distinguish which pair are closing first if an adjustment is to be made.

According to the present invention there is provided a method of determining the contact-closing behavior of a bifurcated cantilever spring whose two arms each carry a respective contact adjacent their free ends for respective cooperation with two further contacts, comprising applying an alternating voltage across the spring and the two further contacts, and monitoring with a search coil the alternating magnetic field produced by the alternating current that flows when one or both pairs of contacts are closed, the magnetic field being monitored closer to one arm than the other.

An embodiment of the invention will now be described, by way of example, with reference to the accompanying drawings, in which.

Figure 1:
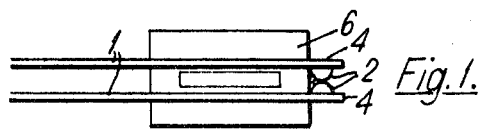
FIG. 1 is a side view of a pair of bifurcated springs and a search coil for determining their behavior.
Figure 2:
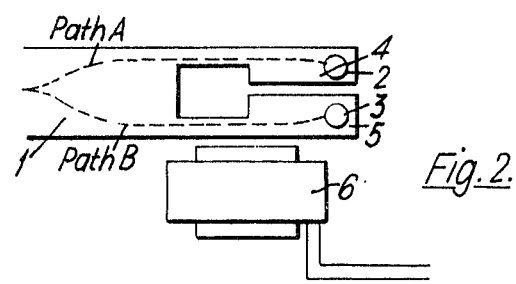
FIG. 2 is a plan view of the springs and coil of FIG. 1.
Figure 3:
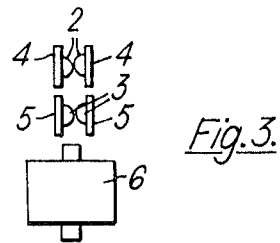
FIG. 3 is an end view of the springs and coil.

Referring to the drawings, two bifurcated cantilever springs 1 of a telephone relay each carry contacts 2, 3, adjacent free ends of their arms 4, 5, respectively. The springs are disposed substantially parallel to one another and the pairs of contacts 2,2 and 3,3 can be opened and closed by actuating means not shown.

To determine the contact-closing behavior of the springs a search coil 6 is disposed to one side of the springs 1 adjacent their arms 5, although the coil could equally well be disposed on the other side of the springs adjacent the arms 4, or between either pair of arms 4 or 5 if made small enough. An alternating voltage is applied across the springs, and the search coil monitors the alternating magnetic field produced adjacent the arms 5 by the alternating current which flows in the springs when one or both pairs of contacts are closed.

The voltage output from the search coil will be small if the farther contact pairs 2,2 only are closed (all the current flowing in path A), a value several times larger than this if both contact pairs are closed (current flowing in both paths A and B) and a value about twice as large as the second value if the contact pair 3,3 nearest the coil only is made (current all flowing in path B).

The absolute values of these voltages will depend on the current flowing in the springs and the number of turns of the search coil. However, the relative values are such that they can easily be distinguished. Typical values are:

Current in Spring: 100 mA. 100 kHz.
Voltage from search: coil 20 mv. max.

The method can be carried out either with the springs stationary, to determine the condition of the contacts at a particular position of the springs, or while operating the relay, to determine the order of closing.

As indicated before a variety of positions for the search coil can be adopted. However, the essential condition is that the magnetic field should be monitored closer to one pair of arms 4,4 or 5,5 than the other, thereby being able to distinguish between the different conditions described above.

Some relays employ a single bifurcated spring in conjunction with a plane spring with double contacts. The method is equally applicable to this arrangement, magnetic field being monitored closer to one arm than the other.

It is to be understood that the foregoing description of specific examples of this invention is not to be considered as a limitation of its scope.

WHAT WE CLAIM IS:

1. A method for determining the contact-closing behavior of a bifurcated cantilever spring having two arms each carrying a respective contact adjacent to their free ends for respective cooperation with two further contacts, comprising applying an alternating voltage across the spring and the two further contacts, and monitoring with a search coil the alternating magnetic field produced by the alternating current that flows when one or both pairs of contacts are closed, the magnetic field being monitored closer to one arm than the other.

2. The method claimed in claim 1, wherein the search coil is disposed to one side of the cantilever spring adjacent to one arm thereof.